United States Patent Office 3,510,493
Patented May 5, 1970

3,510,493
2-BENZYLAMINOMETHYL CYCLOALKYLAMINES
Ronald H. Rynbrandt, Kalamazoo, Mich., assignor to The Upjohn Company, Kalamazoo, Mich., a corporation of Delaware
No Drawing. Filed May 13, 1968, Ser. No. 728,797
Int. Cl. C07d *29/28, 87/38*
U.S. Cl. 260—294.7        6 Claims

ABSTRACT OF THE DISCLOSURE

Compounds of the formula:

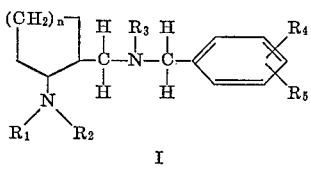

I wherein $n$ is 1 to 4, inclusive; wherein $R_1$ and $R_2$ are selected from the group consisting of lower-alkyl and benzyl, or wherein the group

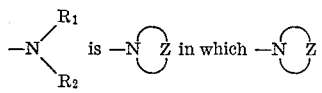

represents a heterocyclic amino radical containing from 5 to 9 nuclear atoms, inclusive; wherein $R_3$ is selected from the group consisting of hydrogen, lower-alkyl and benzyl; and wherein $R_4$ and $R_5$ are selected from the group consisting of hydrogen, lower-alkyl, lower-alkoxy, hydroxy, halogen and —$CF_3$. Formula I is intended to illustrate both cis and trans compounds. The compounds and their pharmacologically acceptable acid addition salts are useful as oral antidiabetic agents.

BACKGROUND OF THE INVENTION

This invention relates to new organic compounds and is more particularly concerned with cis and trans 1,2-disubstituted cycloalkanes of the formula:

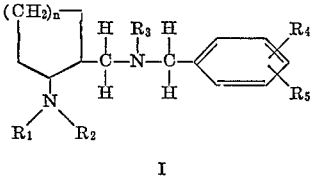

I wherein $n$ is 1 to 4, inclusive; wherein $R_1$ and $R_2$ are selected from the group consisting of alkyl having from 1 to 4 carbon atoms, inclusive, and benzyl, or wherein the group

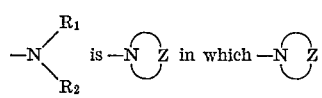

represents a heterocyclic amino radical containing from 5 to 9 nuclear atoms, inclusive; wherein $R_3$ is selected from the group consisting of hydrogen, alkyl as defined above, and benzyl; and wherein $R_4$ and $R_5$ are selected from the group consisting of hydrogen, alkyl and alkoxy having from 1 to 4 carbon atoms, inclusive, hydroxy, halogen and —$CF_3$. Furthermore, the invention comprises the acid addition salts of the compounds of Formula I, particularly the pharmacologically acceptable acid addition salts, the methods of preparation of the compounds of Formula I, and the novel intermediates.

SUMMARY OF THE INVENTION

The novel compounds, intermediates and methods of preparation can be illustratively represented as follows:

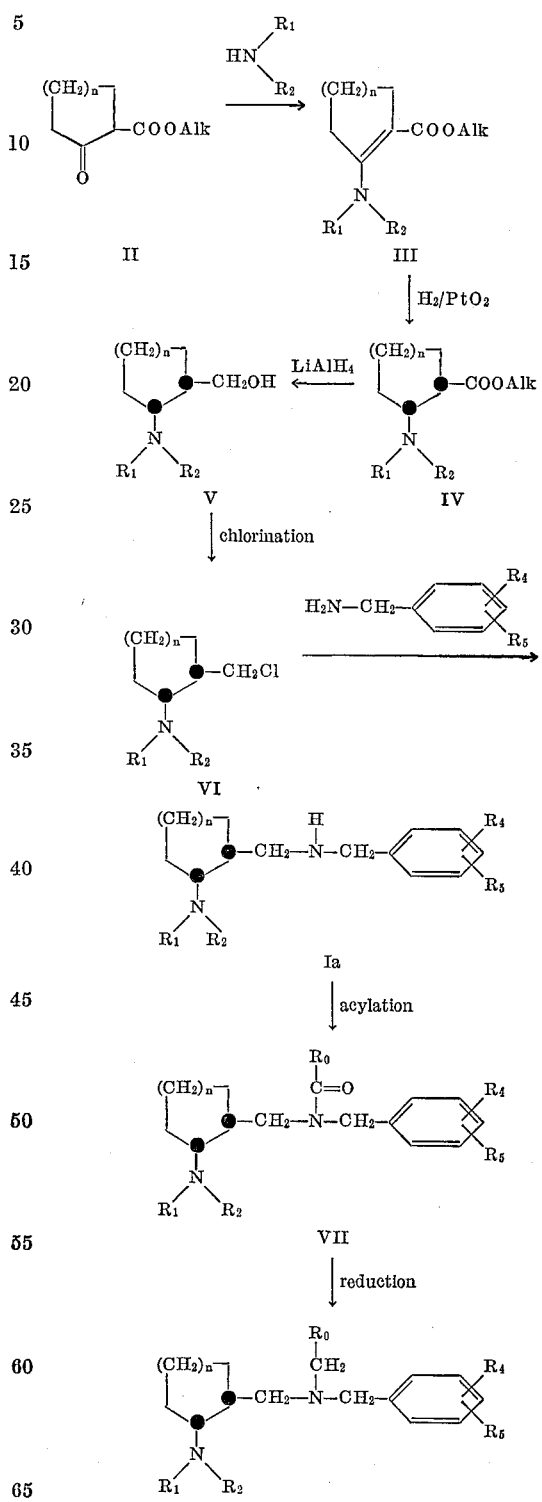

wherein $R_0$ is selected from the group consisting of hydrogen, alkyl having from 1 to 3 carbon atoms, inclusive, and phenyl, and wherein $n$, $R_1$, $R_2$, $R_4$, and $R_5$ are defined as hereinabove, and wherein Alk is a lower alkyl of 1 to 4 carbon atoms, inclusive.

The compounds IV, V, VI, VII, and Ia and Ib are all cis compounds. To obtain the corresponding trans compounds the cis compound IV is treated at reflux temperature with sodium ethoxide in a lower alkanol. From the thus-obtained trans compound IVa:

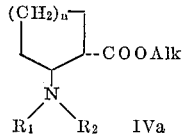

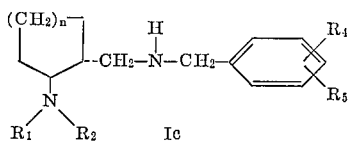

the final trans product Ic:

is obtained by the same steps as above for the cis series, i.e., metal hydride reduction, chlorination and treatment with a selected benzylamine. Further, treatment of Ic with an acylating agent, e.g., formic acid, acyl halides and acid anhydrides, and reduction with a metal hydride, e.g., lithium aluminum hydride, lithium dialuminum heptahydride (LiAl$_2$H$_7$) or diborane provides the trans compound Id:

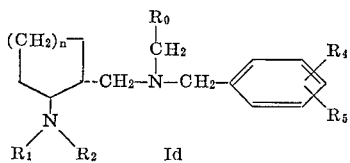

in which $n$, $R_0$, $R_1$, $R_2$, $R_4$, and $R_5$ are defined as above.

Description of the preferred embodiments

Examples of the cycloalkyl radical illustratively represented by the formula

are cyclopentyl, cyclohexyl, cycloheptyl and cyclooctyl.

Examples of the heterocyclicamino radical

having from 5 to 9 nuclear atoms, include: pyrrolidino, 2-methylpyrrolidino, 2-ethylpyrrolidino, 2,2 - dimethylpyrrolidino, 3,4 - dimethylpyrrolidino, 2 - isopropylpyrrolidino, 2-sec.butylpyrrolidino, and like alkylpyrrolidino groups, morpholino, 2-ethylmorpholino, 2-ethyl-5-methylmorpholino, 3,3-dimethylmorpholino, 4-methylpiperazino, 4 - butylpiperazino, piperidino, 2 - methylpiperidino, 3-methylpiperidino, 4-methylpiperidino, 4-propylpiperidino, 2-propylpiperidino, 4-isopropylpiperidino, and like alkylpiperidino groups, hexamethylene imino, 2-methylhexamethyleneimino, 3,6-dimethylhexamethyleneimino, heptamethyleneimino, octamethyleneimino and the like.

Illustrative example of alkyl groups having from 1 to 4 carbon atoms, inclusive, are methyl, ethyl, propyl, isopropyl, butyl, isobutyl and the like.

Illustrative examples of alkoxy groups having from 1 to 4 carbon atoms, inclusive, are methoxy, ethoxy, propoxy, isopropoxy, butoxy, isobutoxy, and the like.

Under halogen substituents is understood fluorine, chlorine, bromine, and iodine.

The methods used for the production of the compounds of Formula I are as follows:

A selected 2-oxocycloalkanecarboxylic acid ester II is heated with a selected secondary amine of formula

in which $R_1$ and $R_2$ are defined as hereinabove, usually in the presence of a catalyst to produce the enamine III; the enamine III is catalytically hydrogenated to give a cis-2-aminocycloalkanecarboxylic acid ester IV, which is then reduced with a metal hydride to give the corresponding cis-2-aminocycloalkanemethanol V; the methanol is chlorinated, e.g., with thionyl chloride, to give the corresponding cis-N-[2-(chloromethyl)-cycloalkyl]amine VI. Treating VI with a selected benzylamine gives the corresponding cis-N-[2 - [(benzylamino)methyl]cycloalkyl] amine (Ia).

Acylation of Ia with an acid anhydride or an acyl chloride or bromide of an alkanoic acid containing from 2 to 4 carbon atoms, inclusive, benzoic anhydride, benzoyl chloride, or formic acid, yields the corresponding cis-N-[2 - [[(benzyl)acylamino]methyl]cycloalkyl]amine VII which can be reduced with a metal hydride, to the corresponding cis-N-[2-[[(benzyl)alkylamino]methyl]cycloalkyl]amine (Ib).

Trans compounds are prepared by isomerizing the cis - 2 - aminocycloalkanecarboxylic acid ester IV with sodium ethoxide in ethanol at reflux temperature to give the trans-2-aminocycloalkanecarboxylic acid ester (IVa). The latter when submitted to the same reactions carried out with IV, that is, metal hydride reduction, chlorination and treatment with a benzylamine yields the trans product Ic which is converted to the alkyl or benzyl derivative Id in the manner shown in the conversion Ia→Ib.

The compounds of Formula I [the compounds of formulae Ia, Ib, Ic, Id, are subgeneric to compound (I)] and their pharmacologically acceptable acid addition salts are useful as orally active antidiabetic agents. These compounds thus provide a means for the relief of diabetes without the necessity of injections. The novel compounds are not only capable of reducing blood sugar to a safe level for a considerable period of time, but, in addition, also bring about satisfactory blood-sugar reduction at low dosage levels. For example, cis-1-[2-[[(p-methoxybenzyl)amino]methyl]cyclohexyl]piperidine as the dihydrochloride reduces blood sugar in rats by 20–25 percent two hours after administration when given orally in a dosage of 25 mg. per kg. body weight.

For such oral administration of the active compounds can be administered in liquid or solid dosage forms. Solid forms include capsules, tablets, powders, pills, and the like, and liquid forms include suitably flavored aqueous suspensions and solutions (depending on concentration desired), and flavored oil suspensions and solutions wherein edible oils, e.g., corn oil, cottonseed oil, coconut oil, peanut oil, sesame oil, or mixtures of these, and the like can be employed.

For preparing compositions such as tablets and other comperssed formulations the composition can include any compatible and edible tableting material used in pharmaceutical practice, e.g., corn starch, lactose, stearic acid, magnesium stearate, talc, methyl cellulose, and the like.

Similarly, the compounds of the present invention can be mixed with suitable adjuvants for the preparation of resorbable hard gelatin or soft capsules utilizing conventional pharmaceutical practices.

The following illustrative composition is within the scope of the present invention:

Hard gelatin capsules—10,000 two-piece hard gelatin capsules for oral use, each containing 250 milligrams of cis-1-[2-[[(p - methoxybenzyl) amino]methyl]cyclohexyl]piperidine dihydrochloride are prepared from the following amounts and types of materials:

| | Gm. |
|---|---|
| Cic-1-[2[[(p-methoxylbenzyl)amino]methyl]cyclohexyl]piperidine dihydrochloride | 2500 |
| Corn starch | 1616 |
| Mineral oil, U.S.P. | 129.6 |
| Magnesium stearate, powder | 162 |
| Talc, U.S.P. | 162 |

The finely powdered cis-1-[2-[[(p-methoxybenzyl)amino]methyl]cyclohexyl]piperidine dihydrochloride is mixed thoroughly with the rest of the ingredients and then capsulated.

As noted above, the new compounds of Formula I can be used in the form of pharmacologically acceptable acid addition salts, with inorganic or organic acids, for example, as hydrochlorides, hydrobromides, sulfates, hydroiodides, phosphates, citrates, lactates, tartrates, salicylates, cyclohexanesulfamates, pamoates, and the like. The acid addition salts can be prepared in conventional manner, for example, by reacting the selected acid with the selected free amine of Formula I, preferably in an aqueous or anhydrous solvent such as water, ether, methanol, ethanol, ethyl acetate or the like. Evaporation of the solvent provides the desired acid addition salt.

The novel compounds are also useful on account of their utility in the non-pharmaceutical field. For example, the fluosilicates of compounds of Formula I are useful as mothproofing agents according to U.S. Pats.1,915,334 and 2,075,359. The thiocyanates of the same compounds can be condensed with formaldehyde to form resinous polymers which according to U.S. Pats. 2,425,320 and 2,606,155 are useful as pickling inhibitors. The trichloroacetates of the same compounds are useful as herbicides, for example against Johnson grass, yellow foxtail, green foxtail, Bermuda grass, and quack grass.

Finally, the compounds of Formula I are easily converted to quaternary ammonium or diquarternary ammonium salts with alkylating agents such as dialkyl sulfates and alkyl halides and silver oxide by methods well known in the art. Thus obtained quaternary ammonium or diquaternary ammonium salts of the compounds of Formula I, particularly those having a lengthy alkyl chain from 8 to 20 carbon atoms, are useful for electrocardiographic jellies, on account of their wetting power and electroconductivity.

A suitable composition of an electrocardiographic jelly thus prepared comprises:

| | Parts |
|---|---|
| Glycerol | 5 |
| Starch | 10 |
| Quaternary ammonium salt | 60 |
| Water | 100 |

The jelly is prepared by mixing the starch, glycerol and water and then adding the quaternary ammonium salt. The mixture is then allowed to stand for at least two days with occasional agitation to allow the formation of a gel.

The starting materials for the present invention are known 2-oxocycloalkanecarboxylic acid lower-alkyl esters (usually methyl or ethyl) of Formula II.

In carrying out the process of the present invention a selected 2-oxocycloalkanecarboxylic acid ester (II) is heated together with a secondary amine such as dimethylamine, diethylamine, dibutylamine, or a heterocyclic amine such as pyrrolidine, piperidine, morpholine, piperazine, alkyl-substituted pyrrolidines, piperidines, morpholines and piperazines, hexamethyleneimine, heptamethyleneimine, octamethyleneimine, and alkyl derivatives thereof and the like. The reaction is carried out in the presence of a solvent such as benzene, toluene, xylenes or the like, preferably in the presence of an acid catalyst such as p-, o-, m-toluenesulfonic acid, benzenesulfonic acid, p-methoxybenzenesulfonic acid, chlorobenzenesulfonic acids or the like. The enaminization can also be carried out in lower alkanols, e.g., methanol, ethanol, butanol and the like. Usually when benzene or toluene or used as solvents, the water is separated by an azeotropic separator. The reaction, preferably carried out at reflux temperature, is terminated after 3 to 96 hours of reflux. After termination of the reaction, the product is isolated by conventional methods, such as distilling to eliminate excess solvent and excess secondary amine.

The thus-obtained enamine III is used without further purification for the catalytic hydrogenation in conventional manner, that is, usually in the presence of platinum oxide catalyst and in ethanol or methanol as solvent. Pressures of 1 to 80 atmospheres are usually employed. The catalyst is used in the ratio of 1% to 5% by weight based on the weight of the enamine III. After termination of the hydrogenation, the product (IV) is isolated from the filtered reaction mixture by evaporating the solvent. It can be further purified by conventional means such as recrystallization.

The thus-obtained ester of Formula IV is thereupon reduced with a metal hydride or diborane. As metal hydride, lithium aluminum hydride and lithium dialuminum heptahydride are preferred. The reaction is preferably carried out in the presence of ether, tetrahydrofuran, or the like. After the reaction is terminated, which is usually between one-half hour to three hours, the mixture is decomposed by the addition of water and aqueous sodium or potassium hydroxide or carbonate. The mixture is then filtered and the filtrate is evaporated to give the desired cis-2-aminocycloalkanemethanol (V).

The thus-obtained alcohol (V) is thereupon chlorinated, preferably with thionyl chloride. Other chlorinating agents such as phosphorus oxychloride can also be used for this chlorination. In the preferred embodiment of this invention the alcohol (V), in a solvent such as chloroform, carbon tetrachloride, methylene chloride or the like, at a low temperature, between 0 to −30° C., is admixed with a molar equivalent or more, e.g., a slight excess of 5 to 50% over the required amount, of thionyl chloride, dissolved preferably in the same solvent. The solution is stirred at a low temperature, about +10 to −20° C. for a period of 10 minutes to 2 hours and thereupon at room temperature and finally at reflux temperature, each time for a period of between 10 minutes to 2 hours. Excess thionyl chloride and solvent are removed, for example by a stream of nitrogen and by vacuum distillation, and the resulting product may be recrystallized to give the corresponding cis-N-[2-(chloromethyl)cycloalkyl]amine as a hydrochloride (VI).

The thus-obtained hydrochloride (VI) is treated with aqueous sodium hydroxide to give the free amine which can be extracted with either methylene chloride or other solvents and can be concentrated to give the free base, cis-N-[2-(chloromethyl cycloalkyl]amine, which is then condensed with the selected benzylamine, for example, an o-, p-, or m-alkoxybenzylamine such as methoxy, ethoxy, propoxy, benzylamines, a halogenated benzylamine such as chloro, iodo, or fluorobenzylamines, trifluoromethylbenzylamines, alkylbenzylamines, unsubstituted benzylamine, or the like. The reaction is carried out in a solvent such as toluene, benzene, xylene, or the like at reflux temperature in the presence of a base capable of absorbing hydrogen chloride, for example, sodium or potassium carbonate. The reaction is preferably carried out during a long period such as from 12 to 96 hours under reflux and under continuous stirring. At the termination of the reaction the mixture is cooled and basified, and the desired product is isolated from the organic layer and the washings of the aqueous layer in conventional manner. The product can be further purified by standard procedures such as by extraction of impurities, crystallization, and recrystallization to give pure cis-N-[2-[(benzylamino)methyl]cycloalkyl]amine (Ia).

If a product of Formula Ib is desired, the compound of formula Ia is first acylated, for example by reflux with excess formic acid, or by treatment with acyl chlorides, acyl bromides or acid anhydrides such as acetyl chloride, propionyl chloride, butyryl bromide, isobutyryl chloride, acetic anhydride, propionic anhydride, butyric anhydride, benzoic anhydride, or benzoyl chloride and the like. The thus-obtained amido compound (VII) is thereupon reduced with lithium aluminum hydride, lithium dialuminum heptahydride, diborane or the like in the same manner as shown for the reduction of the ester (IV) to give the alcohol of the Formula V.

If trans compounds are desired the cis compound of Formula IV, cis-2-aminocycloalkanecarboxylic acid ester, is refluxed for a period of about 3 to 15 hours in a solution of absolute ethanol containing sodium ethoxide. After the reaction is terminated the bulk of the solvent is removed by distillation and the remainder of the mixture is diluted with water and extracted with ether. From the ether extract the product can be obtained by evaporation of the solvent or by an additional extraction with hydrochloric acid, basifying the hydrochloric acid extract with sodium hydroxide and additional ether extraction. After the solvents are removed the trans-2-aminocyclohexanecarboxylic acid ester is obtained which can be subjected to the same reactions as the corresponding cis-compound IV to give the corresponding trans compounds of Formulae Ic and Id as shown above.

The following examples are illustrative of the product and process of the present invention.

EXAMPLE 1

Cis-1-[2-[[(p-methoxybenzyl)amino]methyl]cycylohexyl]piperidine and its dihydrochloride (A) Mixture of methyl and ethyl esters of cis-2-piperidinocyclohexanecarboxylic acid.—The starting ester material employed herein was a mixture of the ethyl (about 65%) and methyl (about 35%) esters of 2-oxocyclohexanecarboxylic acid (Aldrich Chemical Company, Milwaukee, Wis.).

A mixture of the aforesaid ethyl and methyl 2-oxocyclohexanecarboxylates (82 g.), piperidine (63.7 g.; 0.75 mole), 500 ml. of benzene and 0.5 g. p-toluenesulfonic acid was refluxed for 3 days under nitrogen using an azeotropic separator (8.5 ml. of water was collected). The mixture was evaporated to eliminate excess solvent and piperidine. The residue was distilled at 0.05 mm. Hg pressure to give 76 g. of material which contained the desired product, a mixture of methyl and ethyl esters of 2-piperidino-1-cyclohexene-1-carboxylic acid together with the starting ester mixture.

This mixture in two separate portions of 38 g. each and 0.5 g. of platinum oxide in 200 ml. of absolute ethanol was submitted to hydrogenation at an initial hydrogen pressure of about 50 lbs./sq. in. After the hydrogenation of both 38 g. samples was terminated, the reaction mixtures were filtered to remove the catalyst and both filtrates combined and evaporated to give a residue. This residue was dissolved in one liter of ether and the ether solution was extracted 3 times with 200-ml. portions of dilute hydrochloric acid. The aqueous hydrochloric acid fractions were backwashed with two 250-ml. portions of ether and the washings were added to the above ether residue. The hydrochloric acid extracts were basified with aqueous sodium hydroxide solution and extracted with three 200 ml.-portions of ether. The extracts were combined, dried over anhydrous magnesium sulfate, and the ether was removed in vacuo. The resulting residue was distilled in vacuo (0.02 mm. Hg) at 97–99° C. to give 40.5 grams of product, a mixture of methyl and ethyl esters of cis-2-piperidinocyclohexanecarboxylic acid.

(B) Cis-2-piperidinocyclohexanemethanol.—A solution of 36 g. of the mixed methyl and ethyl esters of cis-2-piperidinocyclohexanecarboxylic acid in 60 ml. of absolute ether was added during ½ hour to a suspension of 6.0 g. (0.15 mole) of lithium aluminum hydride in 300 ml. of anhydrous ether cooled in an ice-bath. The reaction mixture was then stirred for ½ hour in the ice bath and then brought to reflux during ½ hour under continuous stirring. Thereafter the reaction mixture was cooled, decomposed by the dropwise addition of (1) 12 ml. water, (2) 4.5 ml. of 20% aqueous sodium carbonate solution, and (3) 21 ml. of water, and filtered to remove precipitated material in the solution. The precipitate was washed several times with ether. The ether wash and ether filtrate were combined, dried over anhydrous magnesium sulfate and the solvent was removed in vacuo to afford, as a white solid, cis-2-piperidinocyclohexanemethanol.

This material was further purified by high vacuum distillation; B.P. 100–102° C. at 0.1 mm. Hg.

Cis-2-piperidinocyclohexanemethanol (2 g.) was treated with hydrogen chloride gas in ether to give the hydrochloride of cis-2-piperidinocyclohexanemethanol, which after recrystallization from absolute ethanol had a melting point of 243–245° C.

*Analysis.*—Calcd. for $C_{12}H_{24}ClNo$ (percent): C, 61.62; H, 9.93; Cl, 15.19; N, 5.99. Found (percent): C, 61.39; H, 10.13; Cl, 15.16; N, 6.09.

(C) Cis-1-[2-(chloromethyl)cyclohexyl]piperidine and its hydrochloride.—A solution was prepared containing 18.9 g. (0.096 mole) of cis-2-piperidinocyclohexanemethanol in 60 ml. chloroform. This solution was added to a stirred, cooled (to below −10° C.) solution of thionyl chloride (14.3 g.; 0.12 mole) in 50 ml. of chloroform. The solution was stirred for ¾ hour at ice-bath temperature, ½ hour at room temperature and was finally kept at reflux temperature for 1 hour. The bulk of the solvent and excess thionyl chloride were removed by passing a current of nitrogen through the solution; the last traces by vacuum distillation (about 10–15 mm. Hg). The resulting residue was recrystallized from ethanol-ether to give 24 g. of cis-1-[2-(chloromethyl)cyclohexyl] piperidine hydrochloride of melting point 201 to 203° C.

An analytical sample had a melting point of 203.5 to 205° C.

*Analysis.*—Calcd. for $C_{12}H_{23}Cl_2N$ (percent): C, 57.09; H, 9.20; Cl, 28.19; N, 5.55. Found (percent): C, 57.38; H, 9.33; Cl, 27.64; N, 5.63.

Treating an aqueous solution of cis-1-[2-(chloromethyl)cyclohexyl]piperidine hydrochloride with aqueous sodium hydroxide until the mixture was basic, then extracting the reaction mixture with ether and evaporating the ether solution gave cis-1-[2-(chloromethyl)cyclohexyl] piperidine free base.

(D) Cis-1-[2-[[(p-methoxybenzyl)amino]methyl] cyclohexyl]piperidine and its dihydrochloride.—A mixture of cis-1-[2-(chloromethyl)cyclohexyl]piperidine (obtained from 5 g. of its hydrochloride above by treatment with aqueous sodium hydroxide solution), 8.22 g. (0.060 mole) of p-methoxybenzylamine, 2.26 g. (0.020 mole) of potassium carbonate and 15 ml. of toluene was heated for 3 days at reflux, under stirring. The solution was then cooled and 25 ml. of aqueous solution of sodium hydroxide was added under stirring. The organic layer was separated and the aqueous layer was extracted with two 50-ml. portions of ether. The ether extracts and organic layer were combined, washed with 50 ml. of water and dried over anhydrous magnesium sulfate. The residue was submitted to vacuum distillation to remove excess p-methoxybenzylamine (at 80–90° C./0.1 mm. Hg). The residue remaining after this removal was treated in ether with hydrogen chloride to give the dihydrochloride which was purified by recrystallization from absolute ethanol to give cis-1-[2-[[(p-methoxybenzyl)amino]methyl]cyclohexyl]piperidine dihydrochloride of M.P. 246.5 to 247.5° C.

*Analysis.*—Calcd. for $C_{20}H_{34}Cl_2N_2O$ (percent): C, 61.65; H, 8.81; Cl, 18.24; N, 7.19. Found (percent): C, 61.44; H, 8.70; Cl, 17.97; N, 7.30.

Treating this dihydrochloride with excess aqueous sodium hydroxide, extracting with ether and evaporating yielded the free cis - 1 - [2 - [[(p-methoxybenzyl)amino] methyl]cyclohexyl]piperidine.

EXAMPLE 2

Cis-1-[2-[[(p-methoxybenzyl)methylamino]methyl] cyclohexyl]piperidine (A) Cis - 1 - [2 - [[(p - methoxybenzyl)formylamino] methyl]cyclohexyl]piperidine.—A solution of 40 g. of cis-1 - [2 - [[(p - methoxybenzyl)amino]methyl]cyclohexyl] piperidine was refluxed for a period of 4 hours in 100 ml. of formic acid. The mixture was then cooled in ice and 400 g. of ice was added to the reaction mixture, followed by 700 ml. of 20% aqueous sodium hydroxide solution, keeping the temperature below 15° C. The mixture was extracted with ether and the extract was washed with water, then with saturated salt solution and dried by passage through sodium sulfate. The dried solution was thereupon evaporated to give an about quantitative yield of product, cis-1-[2-[[(p-methoxybenzyl)formylamino] methyl]cyclohexyl]piperidine which was crystallized from Skellysolve B hexanes.

(B) Cis - 1 - [2 - [[(p - methoxybenzyl)methylamino] methyl]cyclohexyl]piperidine.—A solution of 5.0 g. cis-1 - [2 - [[(p - methoxybenzyl)formylamino]methyl] cyclohexyl]piperidine in 50 ml. of benzene was added to a solution of 5.0 g. of lithium aluminum hydride in 300 ml. of ether. The mixture was thereupon refluxed for 18 hours, cooled in ice and decomposed by successive addition of 5 ml. of water, 5 ml. of aqueous 15% sodium hydroxide solution, and 15 ml. of water. The mixture was then stirred for 2 hours, filtered, and the filtrate evaporated to yield a product which was recrystallized from Skellysolve B hexanes to give cis-1-[2-[[(p-methoxybenzyl) methylamino]methyl]cyclohexyl]piperidine.

EXAMPLE 3

Trans-1-[2-[[(p-methoxybenzyl)amino]methyl]cyclohexyl]piperidine and its dihydrochloride (A) Mixture of methyl and ethyl esters of trans-2-piperidinocyclohexanecarboxylic acid.—A mixture of methyl and ethyl esters of cis-2-piperidinocyclohexanecarboxylic acid (Example 1A) (65 g.; 0.27 mole) was added to a solution of 1 g. sodium in 300 ml. ethanol. The mixture was refluxed for 6 hours, cooled and distilled under reduced pressure until the bulk of the solvent was removed. The remainder was diluted with 500 ml. of water and the water solution was extracted with three 150-ml. portions of ether. The ether extracts were combined and extracted with three 150-ml. portions of dilute hydrochloric acid. The hydrochloric acid extracts were combined, basified with dilute aqueous sodium hydroxide under cooling, and the cooled basic solution was extracted with 3 portions of 150-ml. each of ether. The ether extracts were combined, dried over anhydrous magnesium sulfate and evaporated under reduced pressure to give a mixture of methyl and ethyl esters of trans-2-piperidinocyclohexanecarboxylic acid. This product was purified by vacuum distillation to give 27.5 g. of a mixture of methyl and ethyl esters of trans-2-piperidinocyclohexanecarboxylic acid of B.P. 87–90° C. at 0.02 mm. Hg pressure.

(B) Trans-2-piperidinocyclohexanemethanol. — In the manner given in Example 1B, 5.0 g. (0.021 mole) of the above ester mixture (Example 3A) in 15 ml. of ether was reduced with lithium aluminum hydride (1.0 g. in 75 ml. of ether). The resulting mixture was decomposed with (1) 2 ml. of water, (2) 0.75 ml. of 20% aqueous sodium carbonate solution, and (3) 3.5 ml. of water. The mixture was further processed as in Example 1B. The product was purified by vacuum distillation to give trans-2-piperidinocyclohexanemethanol of boiling point 87–89° C. at 0.02 mm. Hg pressure.

(C) Trans - 1 - [2 - (chloromethyl)cyclohexyl]piperidine hydrochloride.—In the manner given in Example 1C, trans-2-piperidinocyclohexanemethanol (18 g.) in 60 ml. of chloroform was treated in the cold with 14.3 g. of thionyl chloride in 50 ml. of chloroform to give the desired product, trans-1-[2-(chloromethyl)cyclohexyl]piperidine hydrochloride which after two recrystallizations from ethanol-ether had a melting point of 191.5–192.5° C.

*Analysis.*—Calcd. for $C_{12}H_{23}Cl_2N$ (percent): C, 57.09; H, 9.20; Cl, 28.19; N, 5.55. Found (percent): C, 57.49; H, 9.53; Cl. 28.20; N, 5.48.

(D) Trans - 1 - [2 - [[(p - methoxybenzyl)amino] methyl]cyclohexyl]piperidine.—In the manner given in Example 1D, trans-1-[2-(chloromethyl)cyclohexyl]piperidine (obtained by treating the hydrochloride of Example 3C with aqueous sodium hydroxide) was heated in toluene solution with p-methoxybenzylamine and potassium carbonate at reflux temperature to give, first, trans-1-[2-[[(p-methoxybenzyl)amino]methyl]cyclohexyl]piperidine dihydrochloride, and then trans-1-[2-[[(p-methoxybenzyl) amino]methyl]cyclohexyl]piperidine free base.

EXAMPLE 4

Trans-1-[2-[[(p-methoxybenzyl)benzylamino]methyl] cyclohexyl]piperidine

A solution of trans-1-[2-[[(p-methoxybenzyl)amino] methyl]cyclohexyl]piperidine and benzoic anhydride in pyridine was heated to give trans-1-[2-[[(p-methoxybenzyl)benzoylamino]methyl]cyclohexyl]piperidine.

This product was reduced with lithium aluminum hydride in ether-tetrahydrofuran to give trans-1-[2-[[(p-methoxybenzyl) - benzylamino]methyl]cyclohexyl]piperidine.

In the manner given in the foregoing example using other starting materials and other substituted benzylamines, different compounds of Formula I are produced. Representative compounds, thus obtained, include:

cis-1-[2-[(benzylamino)methyl]cyclohexyl]piperidine;
cis-1-[2-[[(p-methylbenzyl)amino]methyl]cyclopentyl]pyrrolidine;
cis-1-[2-[[(p-chlorobenzyl)amino]methyl]cycloheptyl]-2-methylpiperidine;
cis-1-[2-[[(p-hydroxybenzyl)amino]methyl]cyclohexyl] piperidine;
cis-1-[2-[[(o-propylbenzyl)amino]methyl]cyclopentyl]-4-methylpiperazine;
cis-1-[2-[[(p-trifluoromethylbenzyl)amino]methyl] cyclooctyl]hexamethyleneimine;
cis-1-[2-[(benzylamino)methyl]cyclohexyl]-2,2-dimethylpyrrolidine;
cis-1-[2-[[(m-bromobenzyl)amino]methyl]cyclohexyl] pyrrolidine;
cis-1-[2-[[(2,4-dimethylbenzyl)amino]methyl]cyclopentyl]-3-methylpiperidine;
cis-1-[2-[[(o-ethoxybenzyl)methylamino]methyl]cycloheptyl]piperidine;
cis-4-[2-[[(p-propoxybenzyl)ethylamino]methyl] cyclooctyl]morpholine;
cis-1-[2-[[(p-ethoxybenzyl)benzylamino]methyl]cycloheptyl]pyrrolidine;
cis-1-[2-[[(p-butylbenzyl)butylamino]methyl]cyclooctyl] heptamethyleneimine;
cis-1-[2-[[(p-iodobenzyl)propylamino]methyl]cyclohexyl]-4-methylpiperazine;
cis-1-[2-[[(2-methyl-4-bromobenzyl)amino]methyl] cycloheptyl]piperidine;
trans-1-[2-[[(p-butoxybenzyl)amino]methyl]cyclopentyl]piperidine;
trans-1-[2-[[(p-bromobenzyl)amino]methyl]cyclohexyl] heptamethyleneimine;

trans-1-[2-[[(p-hydroxybenzyl)amino]methyl]cyclohexyl]piperidine;
trans-1-[2-[[(o-chlorobenzyl)amino]methyl]cycloheptyl]-2-isopropylpyrrolidine;
trans-1-[2-[[(o-iodobenzyl)amino]methyl]cyclooctyl]piperidine;
trans-1-[2-[[(2,4-diethylbenzyl)amino]methyl]cyclopentyl]octamethyleneimine;
trans-1-[2-[[(m-trifluoromethylbenzyl)methylamino]methyl]cyclohexyl]heptamethyleneimine;
trans-4-[2-[(3,5-dimethylbenzyl)benzylamino]methyl]cyclopentyl]morpholine;
trans-4-[2-[[(m-isopropylbenzyl)ethylamino]methyl]cyclohexyl]morpholine;
trans-1-[2-[[(p-chlorobenzyl)propylamino]methyl]cycloheptyl]pyrrolidine;
trans-1-[2-[[(p-fluorobenzyl)butylamino]methyl]cyclooctyl]piperidine;
trans-1-[2-[[(m-methoxybenzyl)isopropylamino]methyl]cyclohexyl]octamethyleneimine;
trans-1-[2-[[(o-chlorobenzyl)isobutylamino]methyl]cyclopentyl]piperidine and the like.

Treating the before-shown compounds of Formula I

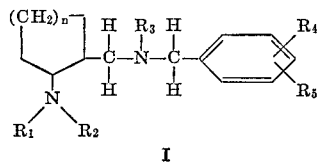

I wherein $n$ is 1 to 4, inclusive; wherein $R_1$ and $R_2$ are selected from the group consisting of alkyl having from 1 to 4 carbon atoms, inclusive, and benzyl, or wherein the group

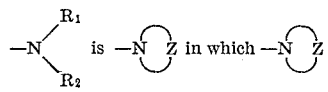

represents a heterocyclic amino radical containing from 5 to 9 nuclear atoms, inclusive; wherein $R_3$ is selected from the group consisting of hydrogen, alkyl as defined above, and benzyl; and wherein $R_4$ and $R_5$ are selected from the group consisting of hydrogen, alkyl and alkoxy having from 1 to 4 carbon atoms, inclusive, hydroxy, halogen and —$CF_3$, with an inorganic or organic acid, and particularly with a pharmacologically acceptable acid produces useful salts, such as the hydrochlorides, hydrobromides, hydroiodides, sulfates, perchlorates, formates, acetates, lactates, tartrates, citrates, maleates, benzoates, trichloroacetates, trifluoroacetates, methanesulfonates, ethanesulfonates, benzenesulfonates, p-toluenesulfonates, p-chlorobenzenesulfonates, p-ethylbenzenesulfonates and the like, of the foregoing amines.

I claim:
1. A member selected from the group consisting of a compound of the Formula I:

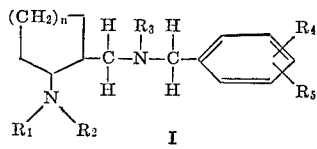

wherein $n$ is 1 to 4, inclusive; wherein $R_1$ and $R_2$ are selected from the group consisting of alkyl having from 1 to 4 carbon atoms, inclusive, and benzyl, or wherein the group

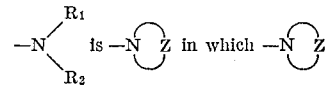

represents a member selected from the group consisting of pyrrolidino, alkylpyrrolidino, morpholino, alkylmorpholino, 4-alkylpiperazino, piperidino, alkylpiperidino, hexamethyleneimino, alkylhexamethyleneimino, heptamethyleneimino, and octamethyleneimino; wherein $R_3$ is selected from the group consisting of hydrogen, alkyl as defined above, and benzyl; and wherein $R_4$ and $R_5$ are selected from the group consisting of hydrogen, alkyl and alkoxy having from 1 to 4 carbon atoms, inclusive, hydroxy, halogen and —$CF_3$ and the acid addition salts thereof.

2. As a pharmacologically acceptable acid addition salt, a compound according to claim 1.

3. A cis compound according to claim 1 wherein $n$ is 2;

is piperidino; $R_3$ and $R_4$ are hydrogen; and $R_5$ is p-methoxy, so that the compound is cis-1-[2-[[(p-methoxybenzyl)amino]methyl]cyclohexyl]piperidine.

4. The dihydrochloride of the compound of claim 3, namely, cis-1 - [2 - [[(p-methoxybenzyl)amino]methyl]cyclohexyl]piperidine dihydrochloride.

5. A trans compound according to claim 1 wherein $n$ is 2;

is piperadino; $R_3$ and $R_4$ are hydrogen; and $R_5$ is p-methoxy, so that the compound is trans-1-[2-[[(p-methoxybenzyl)amino]methyl]cyclohexyl]piperidine.

6. The dihydrochloride of the compound of claim 5, namely, trans-1-[2 - [[(p-methoxybenzyl)amino]methyl]cyclohexyl]piperidine dihydrochloride.

References Cited

UNITED STATES PATENTS 2,828,313    3/1958    Scholz et al.

HENRY R. JILES, Primary Examiner

S. D. WINTERS, Assistant Examiner

U.S. Cl. X.R.

260—239, 247, 247.2, 247.5, 247.7, 268, 293, 294, 294.3, 326.3, 326.5, 326.8, 326.81, 326.85, 468, 562, 563, 570.9; 424—9, 244, 248, 250, 267, 274, 330